US009194380B2

(12) United States Patent
Rodrigues

(10) Patent No.: US 9,194,380 B2
(45) Date of Patent: Nov. 24, 2015

(54) RADIAL HYDRAULIC PUMP WITH A VARIABLE ECCENTRICITY AND DELIVERY

(71) Applicant: HYDR'AM, St Bonnet de Mure (FR)

(72) Inventor: Victor Rodrigues, Mions (FR)

(73) Assignee: HYDR'AM, Saint Bonnet de Mure (FR)

( * ) Notice: Subject to any disclaimer, the term of this patent is extended or adjusted under 35 U.S.C. 154(b) by 512 days.

(21) Appl. No.: 13/654,641

(22) Filed: Oct. 18, 2012

(65) Prior Publication Data
US 2013/0098239 A1  Apr. 25, 2013

(30) Foreign Application Priority Data

Oct. 21, 2011  (FR) .................................... 11 59582

(51) Int. Cl.
| F04B 1/00 | (2006.01) |
| F04B 1/07 | (2006.01) |
| F04B 1/04 | (2006.01) |
| F04B 49/12 | (2006.01) |
| B23D 31/00 | (2006.01) |

(52) U.S. Cl.
CPC .................. *F04B 1/07* (2013.01); *F04B 1/0413* (2013.01); *F04B 49/123* (2013.01); *F04B 49/125* (2013.01); *B23D 31/008* (2013.01)

(58) Field of Classification Search
CPC ........ F01B 1/0624; F01B 1/0689; F04B 1/07; F04B 1/0413; F04B 9/045; F04B 49/123; F04B 49/125
USPC ............................................ 91/6.5, 491, 497
See application file for complete search history.

(56) References Cited

U.S. PATENT DOCUMENTS

| 2,215,488 | A | * | 9/1940 | Svenson ........................ 74/600 |
| 2,404,175 | A | | 7/1946 | Holden et al. |
| 3,828,400 | A | | 8/1974 | Mason et al. |
| 4,132,126 | A | * | 1/1979 | Hussey ..................... 74/479.01 |
| 4,474,104 | A | | 10/1984 | Creffield |
| 4,548,124 | A | * | 10/1985 | Ortelli ........................... 92/12.1 |
| 4,768,421 | A | * | 9/1988 | Schneeweiss ................ 91/497 |
| 5,960,699 | A | * | 10/1999 | Alaze ............................. 92/129 |
| 6,478,548 | B1 | | 11/2002 | Auer |
| 2004/0107828 | A1 | | 6/2004 | Surjaatmadja et al. |
| 2010/0170377 | A1 | | 7/2010 | Auer et al. |

FOREIGN PATENT DOCUMENTS

| CH | 120603 A | * | 6/1927 | ............ F04B 1/0456 |
| DE | 866464 C | * | 9/1950 | .............. F04B 1/113 |

(Continued)

OTHER PUBLICATIONS

French Search Report dated Jul. 27, 2012.

*Primary Examiner* — Dwayne J White
*Assistant Examiner* — Matthew Wiblin
(74) *Attorney, Agent, or Firm* — Burr & Brown, PLLC

(57) ABSTRACT

The disclosure of the present invention describes a hydraulic pump including a frame, a pump shaft capable of being rotated by a thermal or electric motor around an axis which is stationary with respect to the frame, an eccentric sleeve engaged with the pump shaft, at least one stage of pistons arranged to be stationary with respect to the frame and radially extending in pump cylinders defining chambers, and at least one tappet extending in a housing made in the eccentric sleeve and cooperating with at least one resilient means, having a resilience varying according to the load of the downstream circuit emerging at the level of the pump chambers, the tappet actuating means which decrease the piston stroke.

9 Claims, 4 Drawing Sheets

(56) References Cited

FOREIGN PATENT DOCUMENTS

| | | | |
|---|---|---|---|
| EP | 0 122 770 A1 | 10/1984 | |
| EP | 1 090 229 B1 | 4/2001 | |
| EP | 2 006 544 A2 | 12/2008 | |
| FR | 945 332 A | 5/1949 | |
| FR | 2 715 095 A1 | 7/1995 | |
| GB | 588785 A * | 3/1945 | ............ F04B 19/025 |
| JP | 02-218872 A1 | 8/1990 | |

* cited by examiner

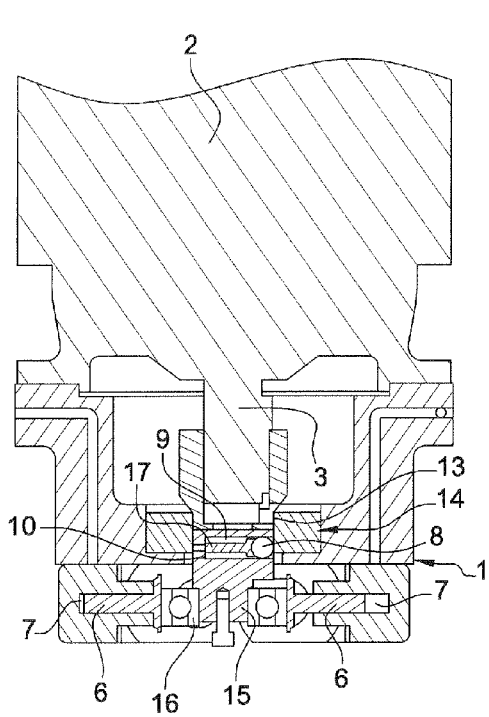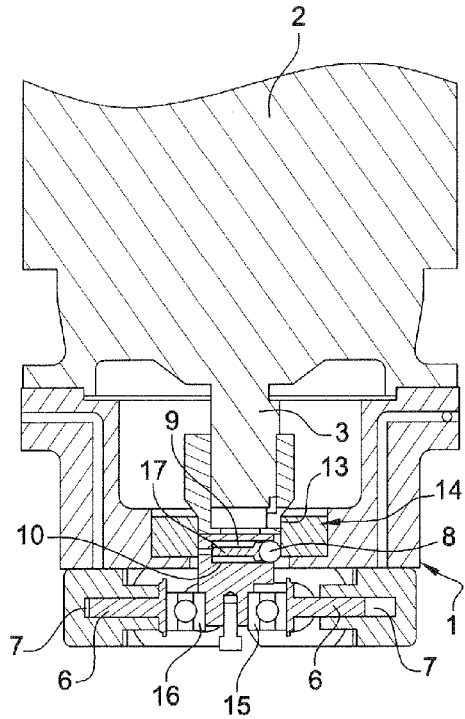
Fig. 4A                                Fig. 4B
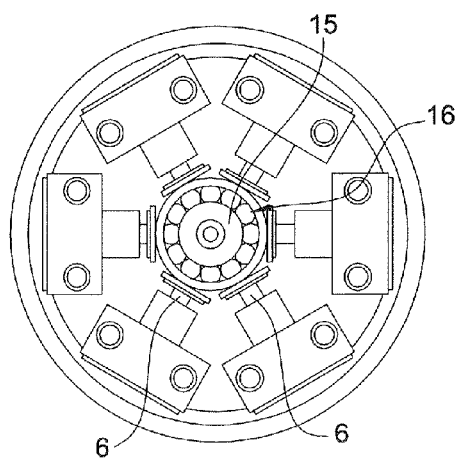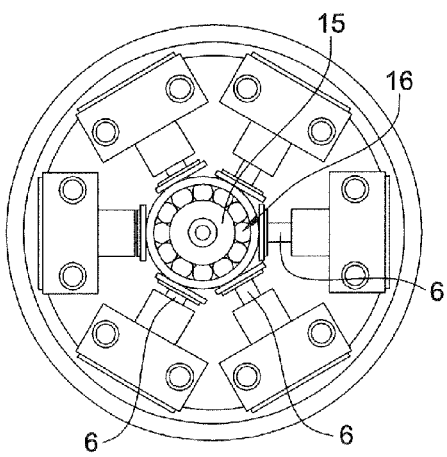
Fig. 5A                                Fig. 5B

RADIAL HYDRAULIC PUMP WITH A VARIABLE ECCENTRICITY AND DELIVERY

BACKGROUND OF THE INVENTION

1. Field of the Invention

The present disclosure relates to a hydraulic pump, and more specifically to a radial hydraulic pump with a variable eccentricity and delivery, intended to supply a hydraulic tool, such as jaws of life, conventionally used in the context of traffic accidents.

2. Description of Related Art

In the field of hydraulic tools, high pressures may be required due to the actions and other stress to be exerted. This is particularly true in the context of jaws of life, which may have to cut profiles or structures of large dimensions. In this context, a high nominal pressure, allowing the tool operation at its maximum power, is not permanently needed. Also, to be able to however use the tool in an entire range of pressures, multiple-stage pumps, and especially two-stage pumps, which provide the adapted pressure while allowing a hydraulic fluid delivery which is generally sufficient with the contemplated application, have been provided.

Despite the provision of such multiple-stage pumps, experience shows that the delivery may be insufficient, thus resulting in a limited actuation speed of the tool having said pump connected thereto. Now, in the context of the contemplated application, that is, in the specific context of the actuation of cutting tools, a higher speed enables to increase the efficiency of said tools.

To partly overcome such disadvantages, it has been provided to use radial hydraulic pumps, also called piston pumps, having a variable eccentricity, that is, for which the stroke of the pistons of said pump is not constant, but is capable of varying to optimally supply the hydraulic tool. Such hydraulic pumps enable to automatically and instantaneously vary the fluid delivery according to the pressure in the hydraulic circuit. Such a hydraulic pump is for example described in document EP 1 090 229. This hydraulic pump comprises a frame, a pump shaft capable of being rotated by a motor, around an axis which is stationary with respect to the frame, an eccentric sleeve engaged with the pump shaft and at least one stage of pistons arranged to be stationary with respect to the frame and radially extending in pump cylinders defining chambers. The eccentric sleeve is assembled on the pump shaft so that its rotation is blocked and so that it is shiftable along the axis of the pump shaft. Further, said sleeve is formed by an oblique cylindrical body which provides with an envelope surface a sliding surface for the pump pistons. Thus, the variable eccentricity is achieved by means of an element to settable in the axial direction and which appears in the form of an oblique cylindrical body.

Document EP 2 006 544 also describes a hydraulic pump of variable eccentricity. Said hydraulic pump comprises a frame, a pump shaft capable of being rotated by a thermal or electric motor, around an axis which is stationary with respect to the frame, an eccentric sleeve engaged with the pump shaft, and at least one stage of pistons arranged to be stationary with respect to the frame and radially extending in pump cylinders defining chambers. The eccentric sleeve is guided along an eccentric axis inclined with respect to the axis of the pump shaft, said eccentric axis having a cylindrical envelope surface, with a cone distance arranged parallel to the pump shaft axis, and a spring extending parallel to the eccentric axis ensures the displacement of the eccentric sleeve along the eccentric axis according to the load of the downstream circuit.

Such hydraulic pumps have the disadvantage of submitting the pump pistons to strong loads, whereby a complex and expensive adaptation of the pump pistons is necessary.

Further, such hydraulic pumps do not enable to reach a 700-bar pressure.

SUMMARY OF THE INVENTION

One of the aims of the present invention thus is to overcome such disadvantages by providing a hydraulic pump with a variable eccentricity and delivery, of simple design and low cost, enabling to provide a pressure that can reach or even exceed 700 bars at the level of a hydraulic tool, such as jaws of life, shears, a spacer, a jack, etc.

For this purpose, the present invention provides a radial hydraulic pump comprising at least a frame, a pump shaft capable of being rotated by a thermal, electric, or hydraulic motor around an axis which is stationary with respect to the frame, an eccentric sleeve engaged with the pump shaft, and at least one stage of pistons arranged to be stationary with respect to the frame and radially extending in pump cylinders defining chambers.

According to the present invention, this pump comprises at least one tappet extending in a housing made in the eccentric sleeve and cooperating with at least one resilient means, having a resilience varying according to the load of the downstream circuit emerging at the level of the pump chambers, said tappet actuating means which decrease the piston stroke.

According to a first embodiment of the pump of the present invention, the eccentric sleeve comprises a radial groove receiving a slide which comprises, on the one hand, a radial cylindrical recess having the resilient means and the tappet extending therein, said cylindrical recess being closed by an inner race of a ball bearing solidly attached to the frame and, on the other hand, a mandrel having its longitudinal axis offset with respect to that of the pump shaft.

Further, said tappet is formed of a ball maintained in permanent contact with the inner race of the ball bearing by a piston extending in the radial recess of the slide and cooperating with the resilient means.

Further, the pump comprises a ball bearing assembled concentrically on the slide mandrel and having its outer race bearing against the radial pump pistons.

According to a second embodiment of the pump according to the present invention, the eccentric sleeve comprises a substantially radial cylindrical recess, in which extend the resilient means and the tappet which protrudes in an eccentric radial groove and which bears against the head of a pivot jointed to the frame by means of a swivel, said pivot cooperating with an eccentric bush having its cone distance bearing against the radial pump pistons.

Said tappet is preferably formed of a substantially cylindrical finger.

Further, the cylindrical recess forms an angle α with the radial axis of the pump shaft, said angle α preferably ranging between 5 and 45°.

Further, the swivel is formed of a seat solidly attached to the frame and comprising a hemispherical recess having a spherical head solidly attached to the distal end of the pivot bearing inside of it, said pivot comprising, close to its distal end, a spherical portion bearing on the inner cone distance of the eccentric bush which bears on the seat.

Said resilient means are advantageously formed of a helical spring.

BRIEF DESCRIPTION OF THE DRAWINGS

The foregoing and other objects, features, and advantages of the variable-eccentricity radial hydraulic pump according to the present invention will be discussed in detail in the following non-limiting description of specific embodiments in connection with the accompanying drawings.

FIGS. 5A and 5B are simplified front views of the positions of the radial pistons of the pump of FIG. 1, respectively in a position of minimum eccentricity and in a position of maximum eccentricity.

DETAILED DESCRIPTION OF THE INVENTION

Figure 1:
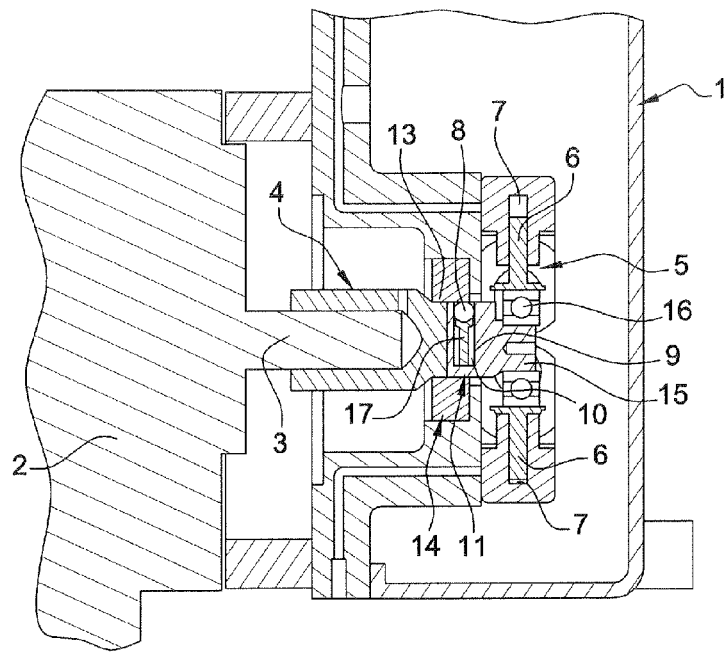
FIG. 1 is a simplified longitudinal cross-section view of the variable-eccentricity radial hydraulic pump according to a first embodiment of the present invention.

For clarity, in the following description, the same elements have been designated with the same reference numerals in the different drawings. Further, the various cross-section views are not necessarily drawn to scale.

Referring to FIG. 1, the hydraulic pump according to a first embodiment of the present invention comprises:
- a frame (1) having a thermal, electric, or hydraulic motor (2) solidly attached thereto, comprising an output shaft called pump shaft (3) rotated around an axis which is stationary with respect to the frame (1),
- an eccentric sleeve (4) engaged with the pump shaft (3) and
- a stage (5) of pistons (6) arranged to be stationary with respect to the frame (1), each piston (6) radially extending in a pump cylinder (7) defining a chamber.

Figure 2:
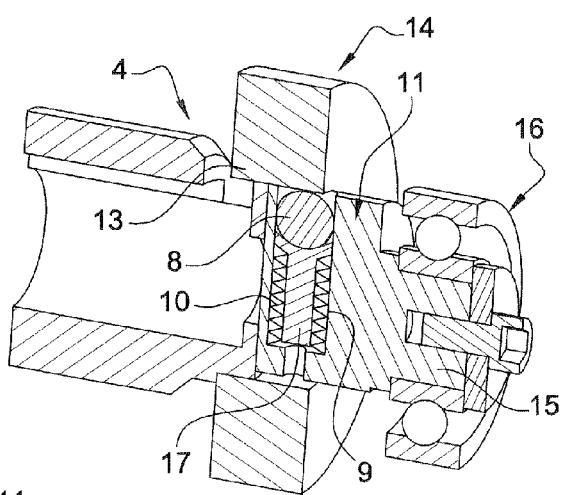
FIG. 2 is a simplified perspective view of the eccentric sleeve and of the slide of the pump of FIG. 1.
Figure 3:
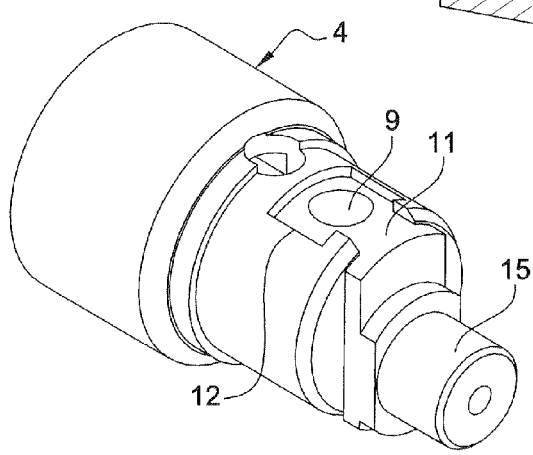
FIG. 3 is a simplified perspective view of the eccentric sleeve and of the slide of the pump of FIG. 1, FIGS. 4A and 4B are simplified longitudinal cross-section views of the pump of FIG. 1 in a position of minimum eccentricity and respectively in a position of maximum eccentricity.

The eccentric sleeve (4), referring to FIGS. 1 to 3, comprises a tappet (8) substantially radially extending in a radial cylindrical recess (9) formed in the eccentric sleeve (4), and cooperating with resilient means (10) having a resilience which varies according to the load of the circuit downstream of the pump, and the tappet (8) actuates means which vary the stroke of the pistons (6).

The means comprise a slide (11) capable of radially shifting in a radial groove (12), forming a radial slide rail, formed in the eccentric sleeve (4).

The slide (11) comprises:
- on the one hand, the radial cylindrical recess (9) having the resilient means (10) and the tappet (8) extending therein, the cylindrical recess (9) being closed by an inner race (13) of a ball bearing (14) solidly attached to the frame (1), as shown in FIGS. 1 and 2, and
- on the other hand, a mandrel (15) having its longitudinal axis offset with respect to that of the pump shaft (3).

A second ball bearing (16) is concentrically assembled on the mandrel (15) of the slide (11), the outer race of this second ball bearing (16) bearing against the radial pistons (6) of the pump.

It should be noted that the length of the slide (11) is slightly shorter than the diameter of the inner race (13) of the ball bearing (14) so that the slide (11) is capable of shifting from a position of minimum eccentricity, where the tappet (8) totally extends in the recess (9), to a position of maximum eccentricity where part of the tappet (8) protrudes from the recess (9), and conversely, as will be detailed hereinafter.

Further, referring to FIGS. 1 and 2, the tappet (8) is formed of a ball maintained in permanent contact with the inner race (12) of the ball hearing (13) by a piston (17) extending in the radial recess (9) of the slide (11) and cooperating with the resilient means (10). Said resilient means (10) for example are a helical spring having a thickness to be selected by those skilled in the art.

Of course, the helical spring (10) may be replaced with any equivalent resilient means well known by those skilled in the art, and for example by spring washers or by cup washers. The slide (11) and the tappet (8) may have any shape and still be within the scope of the present invention.

The operation of the hydraulic pump according to this first embodiment will now be described in relation with FIGS. 4A, 4B and 5A, 5B.

Referring to FIGS. 4A and 5A, the slide (11) is in a position of minimum eccentricity where the tappet (8) fully extends in the recess (9) when the resultant action of the discharging pistons is greater than that of the helical spring (10). Indeed, the initial value thereof corresponds to a reference pressure, said reference pressure corresponding to the pressure of the assembly of pistons (6) and being arbitrarily set.

The helical spring (10) or the equivalent resilient means remain compressed and the eccentricity then keeps a minimum value until the pressure in the pistons (6) becomes smaller than or equal to the reference pressure depending on the load of the downstream hydraulic circuit.

When the pressure in the pistons (6) is smaller than or equal to the reference pressure, referring to FIGS. 4B and 5B, the helical spring (10) elongates until a portion of the tappet (8) protrudes from said recess (9), thus displacing the slide (11) and, in the end, the mandrel (15), to increase the eccentricity.

Thereby, the hydraulic pump provides a critical load pressure corresponding to a position of maximum eccentricity of the pump (FIGS. 4B, 5B), where the pump delivery is maximum, followed by a minimum pressure, corresponding to a position of minimum eccentricity (FIGS. 4A, 5A) of the pump where the value of the pump delivery is minimum, the pump delivery passing from a maximum value to a minimum value and conversely, and this, progressively.

Figure 6:
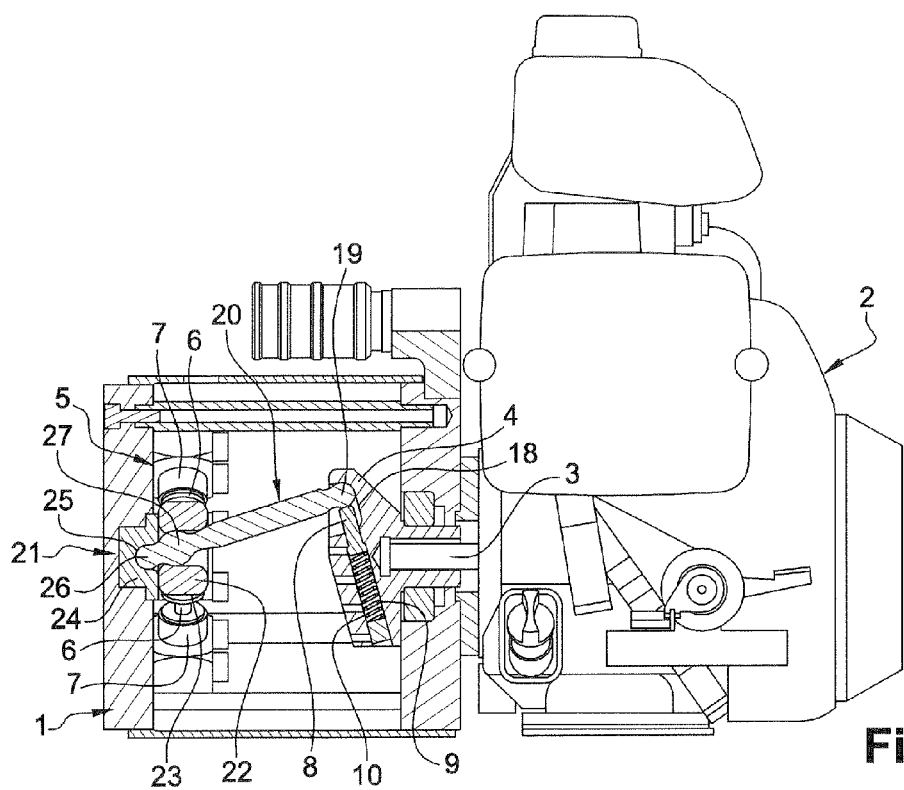
FIG. 6 is a simplified longitudinal cross-section view of a second embodiment of the pump of the present invention in a position of maximum eccentricity.
Figure 7:
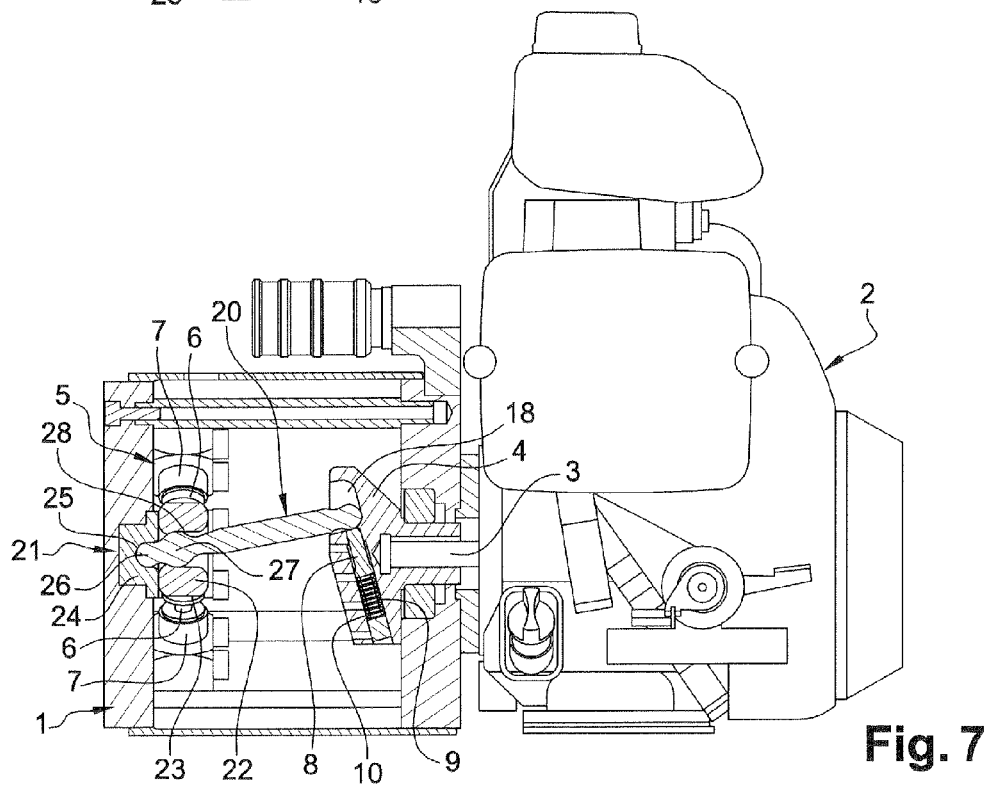
FIG. 7 is a view similar to FIG. 6, in a position of minimum eccentricity.

According to an alternative embodiment of the hydraulic pump of the present invention, referring to FIGS. 6 and 7, said pump comprises, in the same way as previously, a frame (1) having a thermal or electric motor (2) solidly attached thereto, comprising an output shaft called pump shaft (3) rotated around an axis which is stationary with respect to the frame (1), an eccentric sleeve (4) engaged with the pump shaft (3), and a stage (5) of pistons (6) arranged to be stationary with respect to the frame (1), each piston (6) radially extending in a pump cylinder (7) defining a chamber.

Said eccentric sleeve (4), referring to FIGS. 1 to 3, comprises a tappet (8) substantially radially extending in a recess (9) formed in the eccentric sleeve (4), and cooperating with resilient means (10) having a resilience which varies according to the load of the circuit downstream of the pump, and said tappet (8) actuates means which vary the stroke of the pistons (6).

This hydraulic pump differs from the former one by the fact that the eccentric sleeve (4) comprises a substantially radial cylindrical recess (9) in which extend the resilient means (10), such as a helical spring, for example, and the tappet (8), which is capable of protruding in an eccentric radial groove (18) and which bears against the head (19) of a pivot (20) jointed to the frame (1) by a swivel (21). Said pivot (20) cooperates with an eccentric bush (22), having its cone distance (23) bearing against the radial pistons (6) of the pump.

In this specific embodiment, the cylindrical recess (9) forms an angle α with the radial axis of the pump shaft (3), preferably ranging between 5 and 45°, and the tappet (8) is a substantially cylindrical finger.

Further, the swivel (21) is formed of a seat (24) solidly attached to the frame (1) and comprising a hemispherical recess (25) having a spherical head (26) solidly attached to the distal end of the pivot (20) bearing inside of it. Said pivot (20) comprises, close to its distal end, a spherical portion (27) bearing on the inner cone distance (28) of the eccentric bush (22) which also bears on the seat (24).

The operation of the hydraulic pump according to this second embodiment of the present invention will now be explained in relation with FIGS. 6, 7 and 8A, 8B.

Figure 8A:
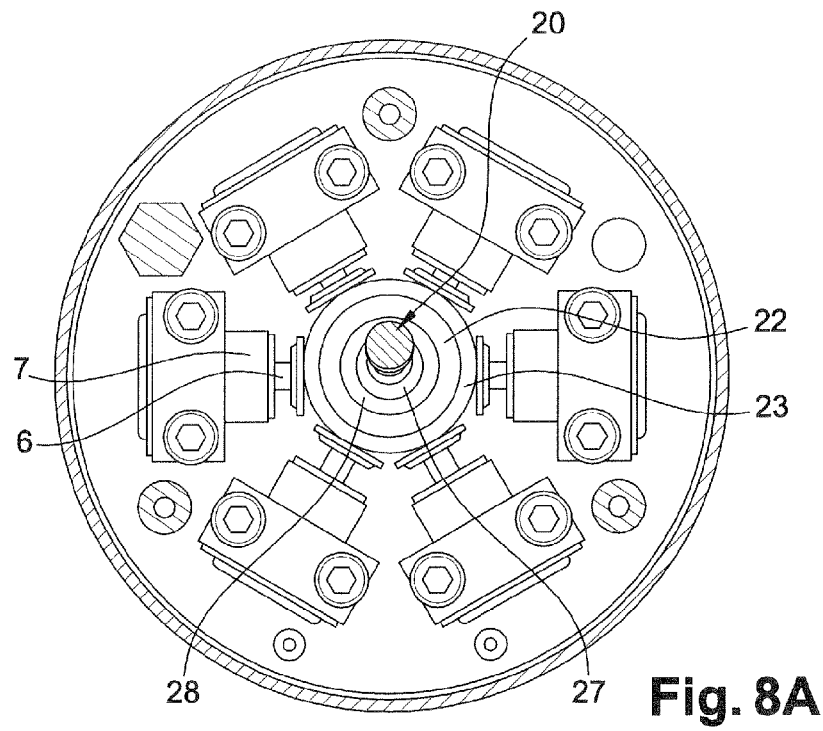
FIGS. 8A and 8B are simplified front views of the positions of the radial pistons of the pump of FIGS. 6 and 7, respectively in a position of minimum eccentricity and in a position of maximum eccentricity.

Referring to FIGS. 6 and 8A, the pivot (20) is in a position of maximum eccentricity where the tappet (8) fully extends in the radial groove (18) when the resultant action of the discharging pistons is greater than that of the helical spring (10). The initial value thereof corresponds to a reference pressure, said reference pressure corresponding to the pressure of the assembly of pistons (6) and being arbitrarily set.

The helical spring (10) remains elongated and the eccentricity then keeps a maximum value until the pressure in the pistons (6) becomes greater than or equal to the reference pressure depending on the load of the downstream hydraulic circuit.

Figure 8B:
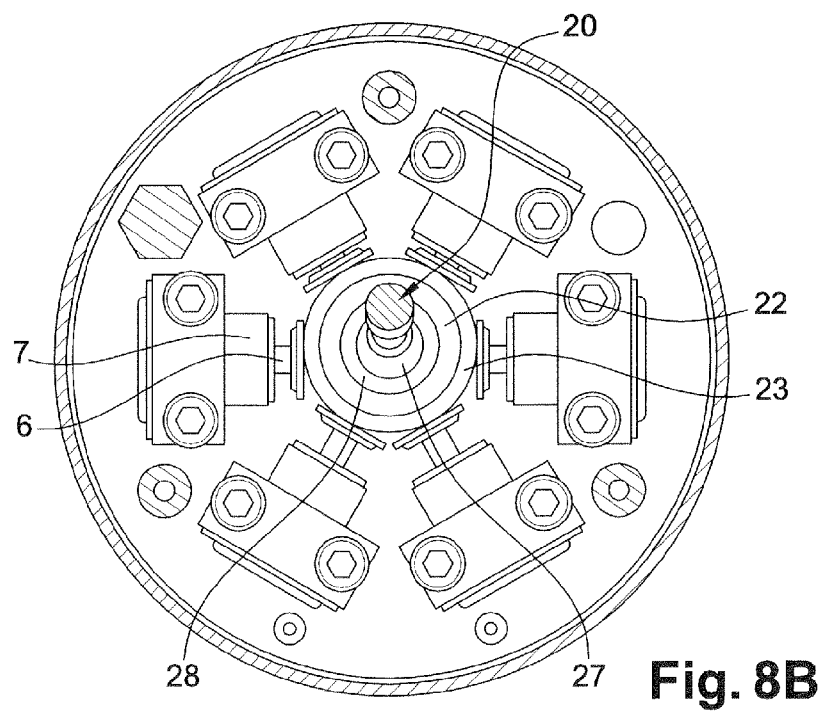

When the pressure in the pistons (6) is greater than or equal to the reference pressure, referring to FIGS. 7 and 8B, the helical spring (10) compresses until the tappet (8) fully extends in the recess (9), thus causing a rotation of the pivot (20) and, eventually, a displacement of the eccentric bush (22) to decrease the eccentricity.

When the pressure in the pistons (6) falls back down to the reference pressure or below, the helical spring elongates again so that the tappet (8) protrudes in the radial groove (18) to cause a rotation of the pivot (20) and, in the end, the displacement of the eccentric bush to its position of maximum eccentricity (FIGS. 6 and 8A).

The length of the pivot (20) is adapted to the engine power or to the desired delivery (especially at high pressure).

This embodiment has the advantage of being less power-consuming or of requiring a smaller motor size. Indeed, if a greater delivery is desired while keeping the basic or standard motor, the length of the pivot (20), which will have its effort amplified, just has to be increased.

Finally, it should be understood that the above examples are specific illustrations only, which are by no means limiting as to the fields of application of the present invention. Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A radial hydraulic pump comprising at least a frame, a pump shaft capable of being rotated by a motor around an axis which is stationary with respect to the frame, an eccentric sleeve engaged with the pump shaft, and at least one stage of pistons, arranged to be stationary with respect to the frame and radially extending in pump cylinders defining chambers, comprising at least one tappet received in a recess formed in the eccentric sleeve and cooperating with at least one resilient means, having a resilience which varies according to a load of a downstream circuit emerging at the level of the pump chambers, a tappet actuating means decreasing a stroke of the pistons, wherein the eccentric sleeve comprises a radial groove forming a radial slide rail receiving a slide which comprises, on a first end, a radial cylindrical recess having the resilient means and the tappet extending therein, said cylindrical recess being closed by an inner race of a ball bearing solidly attached to the frame and, on a second end, a mandrel having its longitudinal axis offset with respect to that of the pump shaft, and wherein the tappet is formed of a ball maintained in permanent contact with the inner race of the ball bearing by a piston extending in the radial recess of the slide and cooperating with the resilient means.

2. The radial hydraulic pump of claim 1, comprising a ball bearing concentrically assembled on the mandrel of the slide, and having its outer race bearing against the radial pistons of the pump.

3. The radial hydraulic pump of claim 1, comprising a ball bearing concentrically assembled on the mandrel of the slide, and having its outer race bearing against the radial-pistons of the pump.

4. The radial hydraulic pump of claim 1, wherein the eccentric sleeve comprises a substantially radial cylindrical recess in which resides the resilient means and the tappet, which protrudes in an eccentric radial groove and which bears against a head of a pivot jointed to the frame by a swivel, said pivot cooperating with an eccentric bush having its cone distance bearing against the radial pistons of the pump.

5. The radial hydraulic pump of claim 4, wherein the tappet is a substantially cylindrical finger.

6. The radial hydraulic pump of claim 4, wherein the radial cylindrical recess forms an angle α with the radial axis of the pump shaft.

7. The radial hydraulic pump of claim 6, wherein the value of angle α ranges between 5 and 45°.

8. The radial hydraulic pump of claim 4, wherein the swivel is formed of a seat solidly attached to the frame and comprising a hemi-spherical recess having a spherical head solidly attached to a distal end of the pivot bearing inside of it, said pivot comprising, close to the distal end, a spherical portion bearing on the inner cone distance of the eccentric bush which bears on the seat.

9. The radial pump of claim 1, wherein the resilient means are formed of a helical spring.

* * * * *